(12) United States Patent
Godycki

(10) Patent No.: US 10,778,111 B1
(45) Date of Patent: Sep. 15, 2020

(54) VOLTAGE CONTROLLED ADJUSTABLE CURRENT SOURCE

(71) Applicant: Eridan Communications, Inc., Santa Clara, CA (US)

(72) Inventor: Waclaw Godycki, Portland, OR (US)

(73) Assignee: Eridan Communications, Inc., Mountain View, CA (US)

(*) Notice: Subject to any disclaimer, the term of this patent is extended or adjusted under 35 U.S.C. 154(b) by 0 days.

(21) Appl. No.: 16/570,948

(22) Filed: Sep. 13, 2019

(51) Int. Cl.
*H02M 5/293* (2006.01)

(52) U.S. Cl.
CPC .... *H02M 5/293* (2013.01); *H02M 2005/2932* (2013.01)

(58) Field of Classification Search
CPC .................................................. H02M 5/293
USPC .......................................................... 327/543
See application file for complete search history.

(56) References Cited

U.S. PATENT DOCUMENTS 9,450,568 B1 * 9/2016 Hawkins .............. H03K 17/162

* cited by examiner

*Primary Examiner* — Tomi Skibinski
(74) *Attorney, Agent, or Firm* — Patent Law Professionals, P.C.; William E. Winters

(57) ABSTRACT

A current regulating apparatus capable of regulating an electrical current with a high level of precision and over a wide range of voltages includes a first depletion mode field-effect transistor (FET), a second depletion mode FET, and a fixed resistor. The second depletion mode FET and fixed resistor are connected in series and across the gate-source terminals of the first depletion mode FET. The first depletion mode FET operates as an adjustable current source while the second depletion mode FET is controlled to operate as a voltage controlled resistor. The magnitude of current regulated by the current regulating apparatus is determined based on both the resistance of the fixed resistor and a current-setting control voltage applied to the gate of the second depletion mode FET. Various precision values of regulated current can be realized by simply changing the current-setting control voltage.

11 Claims, 2 Drawing Sheets

VOLTAGE CONTROLLED ADJUSTABLE CURRENT SOURCE

BACKGROUND OF THE INVENTION

A current source is an electrical device that maintains a constant current regardless of changes in voltage across it. Current sources can be constructed in various ways. FIG. 1 shows one approach known in the art as a current-regulating diode (or "CR diode") 100. The CR diode 100 is typically constructed from an n-channel junction field effect transistor (JFET) but may also be constructed from an n-channel depletion mode metal-oxide-semiconductor FET (MOSFET) 102, as in FIG. 1. Both the n-channel JFET and n-channel depletion mode MOSFET are 'normally ON,' meaning that they have a negative threshold voltage $V_{th}$ and can only be turned OFF if their gate-source voltage $V_{GS}<V_{th}$. In the CR diode 100 depicted in FIG. 1 the gate-source voltage is $V_{GS}=0$. Accordingly, so long as the drain voltage $V_D$ remains greater than $-V_{th}$, the FET 102 remains ON and the CR diode 100 maintains (i.e., regulates) a constant current $I_{DSS}$ proportional to the square of the FET's 102's threshold voltage $V_{th}$, i.e., $I_{DSS} \propto (V_{th})^2$.

The CR diode 100 is only capable of regulating a single fixed current $I_{DSS}$. If a different and lower current is needed, a variable resistor $R_{CR}$ 204 can be inserted between the source of the FET 202 and ground, as illustrated in FIG. 2. So long as $V_{GS}>V_{th}$ and $V_{DS}$ remains higher than the knee voltage $V_K$, i.e., $V_{DS}>V_K=V_{GS}-V_{th}$, the CR diode 200 is able to regulate various values of drain current $I_{D1}$, $I_{D2}$, . . . , etc., each having a value depending on the resistance setting of the variable resistor $R_{CR}$ 204.

Although the adjustable-current CR diode 200 is able to regulate different values of drain current $I_{D1}$, $I_{D2}$, . . . , etc., it is not an optimal solution, especially when high precision is required. One problem relates to the fact that CR diodes are most often used in integrated circuits but there is no way to adjust the variable resistor $R_{CR}$ 204 when implemented in an integrated circuit. Another problem is that even in situations where the CR diode 200 is designed to have a fixed resistor to realize a specific desired $I_D$ and is manufactured in an IC, the resulting CR diode 200 does not always produce the current $I_D$ according to the design. Deviation from the intended (i.e., designed) current $I_D$ is caused by inconsistencies and variabilities in the IC manufacturing processes, which not only can affect the ability to manufacture high precision resistors repeatedly but which also have an impact on the intended performance of the CR diode's 200's FET 202. Yet another problem with prior art CR diodes is that their output conductance $g_{OUT}=\partial I_{DS}/\partial V_{DS}$ can be higher than desired in some applications. The output conductance $g_{OUT}$ provides an indication of how effective the CR diode is at serving as a current source, in other words, how effective it is at regulating its current for a given value of $V_{GS}$. A CR diode having a high output conductance $g_{OUT}$ is problematic since it means that the CR diode is sensitive to changes in the voltage across it and, as a result, is unable to regulate its current to the extent necessary or desired.

BRIEF SUMMARY OF THE INVENTION

A current regulating apparatus capable of regulating an electrical current with a high level of precision and over a wide range of voltages is disclosed. The current regulating apparatus includes a first depletion mode field-effect transistor (FET), a second depletion mode FET, and a fixed resistor. The second depletion mode FET and fixed resistor are connected in series and across the gate-source terminals of the first depletion mode FET. The first depletion mode FET operates as an adjustable current source while the second depletion mode FET is controlled to operate as a voltage controlled resistor. The magnitude of current regulated by the current regulating apparatus is determined based on both the resistance of the fixed resistor and a current-setting control voltage applied to the gate of the second depletion mode FET. Various precision values of regulated current can be realized by simply changing the current-setting control voltage.

Further details of the invention, including a detailed description of the above-summarized and other exemplary embodiments of the invention, will now be described with reference to the accompanying drawings, in which like reference numbers are used to indicate identical or functionally similar elements.

DETAILED DESCRIPTION

Figure 1:
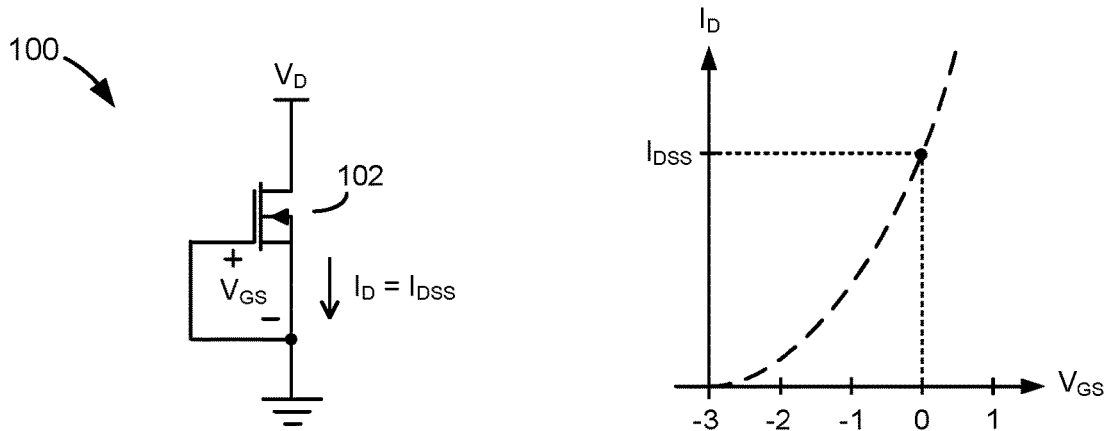
FIG. 1 is a schematic drawing of a conventional fixed-current current regulating (CR) diode.
Figure 2:
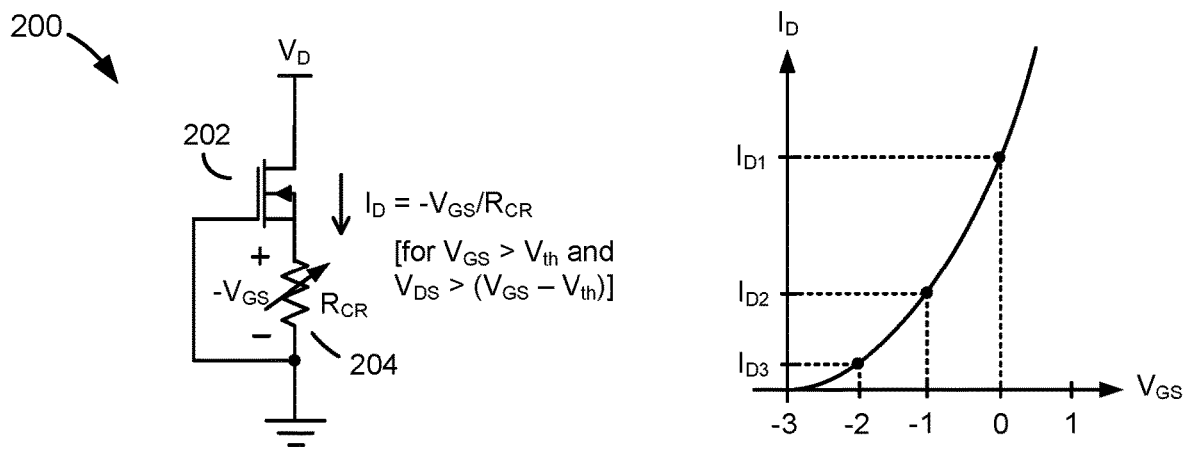
FIG. 2 is a schematic drawing of a conventional adjustable-current CR diode.
Figure 3:
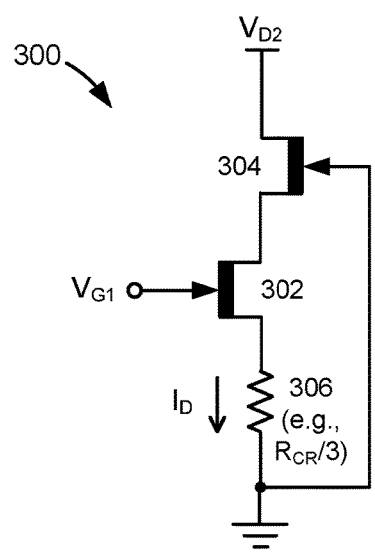
FIG. 3 is a schematic drawing of a voltage controlled adjustable current source, according to one embodiment of the present invention.

Referring to FIG. 3, there is shown a schematic drawing of a voltage controlled adjustable current source 300, according to an embodiment of the present invention. The voltage controlled adjustable current source 300 comprises a first depletion mode field-effect transistor (FET) 302, a second depletion mode FET 304, and a fixed resistor 306. The first depletion mode FET 302 has a drain connected to the source of the second depletion mode FET 304, a source connected to a first terminal of the fixed resistor 306, and a gate configured to receive a current-setting control voltage $V_{G1}$. The second depletion mode FET 304 has a drain configured to receive a drain voltage $V_{D2}$, a gate connected to a second terminal of the fixed resistor 306, and a source connected to the drain of the first depletion mode FET 302.

The voltage controlled adjustable current source 300 is preferably implemented in an integrated circuit (IC), e.g., a monolithic microwave integrated circuit (MMIC), and in the exemplary embodiment of the invention described below and depicted in the drawings the first and second depletion mode FETs 302 and 304 comprise gallium-nitride high electron mobility transistors (GaN-HEMTs) or some other type of III-nitride transistors. While an IC implementation with GaN-HEMTs is preferred, the voltage controlled adjustable current source 300 could be alternatively constructed from discrete devices and the first and second FETs 302 and 304 could comprise other type(s) of depletion mode FET(s), as will be appreciated by those of ordinary skill in the art.

Figure 4:
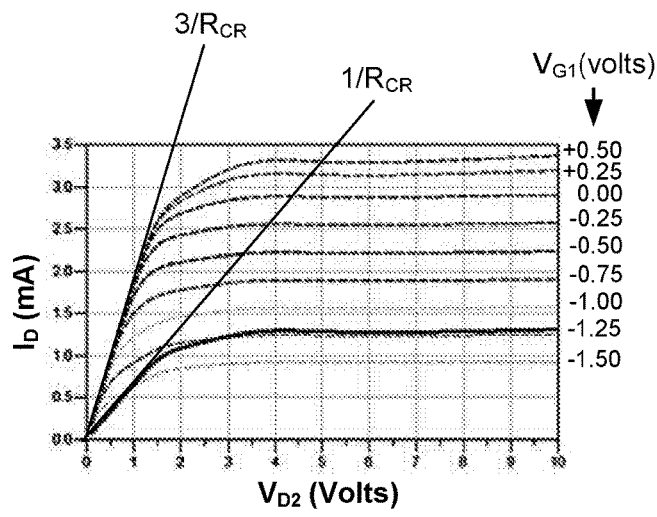
FIG. 4 is a plot of the current regulated by the voltage controlled adjustable current source depicted in FIG. 3, for various values of the current-setting control voltage $V_{G1}$.

The second depletion mode FET 304 in the voltage controlled adjustable current source 300 operates as an adjustable current source while the first depletion mode FET 302 is configured and controlled to operate as a voltage controlled resistor. Operating together, the first and second depletion mode FETs 302 and 304 and fixed resistor 306 regulate a current $I_D$ having a magnitude that depends on both the resistance of the fixed resistor 306 and the current-setting control voltage $V_{G1}$ applied to the gate of the first depletion mode FET 302. The current-voltage (I-V) characteristics of the voltage controlled adjustable current source 300 presented in FIG. 4 illustrate how the magnitude of the regulated current $I_D$ increases as the current-setting control voltage $V_{G1}$ is increased. Various values of regulated current $I_D$ are realized by simply changing the current-setting control voltage $V_{G1}$, which can be provided by an on-chip voltage source or from a voltage source external to the IC.

Including the first depletion mode FET 302 in series with the fixed resistor 306 affords the voltage controlled adjustable current source 300 the ability to set and control the regulated current $I_D$ with a high degree of precision. Because the magnitude of the regulated current $I_D$ can be set and controlled independent of the fixed resistor 306, the current-setting control voltage $V_{G1}$ can also be exploited to fine tune the current $I_D$ and thereby overcome any deviation of the resistance of the fixed resistor 306 from its intended or designed resistance value that may have resulted due to limitations and/or variabilities in the IC manufacturing process.

Figure 5:
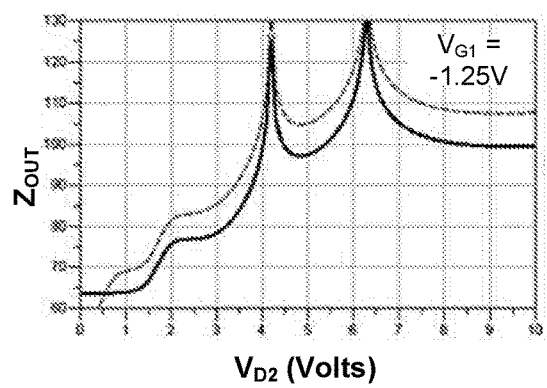
FIG. 5 is a plot of the output impedance $Z_{OUT}$ of the voltage controlled adjustable current source depicted in FIG. 3, when the current-setting control voltage $V_{G1}$ is held at one specific setting.

The presence of the first depletion mode FET 302 has the further benefit of increasing the output impedance $Z_{OUT}=1/g_{OUT}$ of the voltage controlled adjustable current source 300 compared to prior art CR diodes. The increase in output impedance $Z_{OUT}$ can be observed in the output impedance plot provided in FIG. 5, where it is seen that for a $V_{G1}=-1.25V$ and an equivalent $V_{GS}=-1.25V$ in the prior art CR diode 200 the output impedance $Z_{OUT}$ of the voltage controlled adjustable current source 300 remains higher over almost the entire input voltage range $V_{D2}$. This attribute of the voltage controlled adjustable current source 300 is also reflected in the I-V characteristics of the voltage controlled adjustable current source 300 (FIG. 4), where for $V_{G1}=-1.25V$ the output conductance $g_{OUT}=\partial I_{DS}/\partial V_{DS}$ is seen to remain flat over the entire input voltage range $V_{D2}$ above the knee voltage $V_K$ yet for an equivalent gate-source voltage in the prior art CR diode 202 (solid line in FIG. 4) the output conductance is not as flat and varies to a greater extent over equivalent values of input voltages $V_D$.

A final attribute that distinguishes the voltage controlled adjustable current source 300 over prior art CR diode approaches is that the knee voltages $V_K$ for the various values of control voltages $V_{G1}$ that may be applied to it are lower. This attribute is desirable since for a given current-setting control voltage $V_{G1}$ and equivalent $V_{GS}$ in the prior art CR diode 200, the voltage controlled adjustable current source 300 is able to maintain regulation over a wider voltage range $V_{D2}$.

The present invention operates as a transconductance ($g_m$) circuit with $g_m=dI_{D2}/dV_{G1}$. To the extent of the bandwidth available using the implemented transistors, varying the control voltage $V_{G1}$ results in corresponding variation in $I_{D2}$. Thus the precision control of load current in the present invention has an available dynamic characteristic. For example, this present invention can be an input for a trans-resistance amplifier (e.g. a common-gate amplifier).

While various embodiments of the present invention have been presented, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments of the invention but, instead, should be determined by the appended claims, including the full scope of equivalents to which such claims are entitled.

What is claimed is:

1. A voltage controlled adjustable current source, comprising:
   a first depletion mode field-effect transistor (FET) having a gate, a drain, and a source;
   a second depletion mode FET having a gate, a drain configured to receive an input drain voltage, and a source coupled to the drain of the first depletion mode FET; and
   a fixed resistor coupled between the source of the first depletion mode FET and the gate of the second depletion mode FET,
   wherein the first depletion mode FET is controlled to serve as a voltage controlled resistor, the gate of the first depletion mode FET is configured to receive a current-setting control voltage, a magnitude of a current regulated by the voltage controlled adjustable current source is determined by a magnitude of the current-setting control voltage, and the magnitude of the current-setting control voltage is controlled to reduce a deviation of an actual resistance of the fixed resistor from a designed resistance value.

2. The voltage controlled current source of claim 1, wherein the second depletion mode FET comprises a gallium-nitride high electron mobility transistor (GaN-HEMT).

3. The voltage controlled current source of claim 2, wherein the first depletion mode FET comprises a GaN-HEMT.

4. An integrated circuit, comprising:
   a first depletion mode field-effect transistor (FET) configured to operate as a controlled current source;
   a second depletion mode FET coupled to the first depletion mode FET configured to operate as a voltage controlled resistor; and
   a fixed resistor coupled between a gate of the first depletion mode FET and a source of the second depletion mode FET,
   wherein a gate of the second depletion mode FET is configured to receive a current-setting control voltage, a magnitude of a current regulated by the first depletion mode FET is determined by a magnitude of the current-setting control voltage, and the magnitude of the current-setting control voltage is controlled to reduce a deviation of an actual resistance of the fixed resistor from a designed resistance value.

5. The integrated circuit of claim 4, wherein the first and second depletion mode FETs comprise first and second gallium nitride (GaN) high electron mobility transistors or some other III-nitride transistors.

6. A method of regulating a current in an electrical circuit, comprising:
   configuring a first depletion mode field-effect transistor (FET) to operate in its saturation region of operation;
   configuring a second depletion mode FET to operate in its ohmic region of operation, the second depletion mode FET having a drain-source path connected in series with a drain-source path of the first depletion mode FET;

directing an electrical current through the drain-source paths of the first and second depletion mode FETs and through a fixed resistor connected in series with the first and second depletion mode FETs;

applying a current-setting control voltage to a gate of the second depletion mode FET; and regulating the electrical current to a magnitude determined by the resistance of the fixed resistor and a magnitude of the current-setting control voltage applied to the gate of the second depletion mode FET, wherein the magnitude of the current-setting control voltage is adjustable and the magnitude of the regulated current is adjustable over a range of values depending on the magnitude of the current-setting control voltage.

7. The method of claim 6, wherein the first and second depletion mode FETs are formed in an integrated circuit chip.

8. The method of claim 7, wherein the first and second depletion mode FETs comprise first and second gallium nitride (GaN) high electron mobility transistors or some other III-nitride transistors.

9. The method of claim 8, wherein the current-setting control voltage is generated by a voltage source formed in the integrated circuit chip.

10. The method of claim 8, wherein the current-setting control voltage is provided by a voltage source external to the integrated circuit chip.

11. A method of regulating a current in an electrical circuit, comprising:

configuring a first depletion mode field-effect transistor (FET) to operate in its saturation region of operation;

configuring a second depletion mode FET to operate in its ohmic region of operation, the second depletion mode FET having a drain-source path connected in series with a drain-source path of the first depletion mode FET;

directing an electrical current through the drain-source paths of the first and second depletion mode FETs and through a fixed resistor connected in series with the first and second depletion mode FETs;

applying a current-setting control voltage to a gate of the second depletion mode FET;

regulating the electrical current to a magnitude determined by the resistance of the fixed resistor and a magnitude of the current-setting control voltage applied to the gate of the second depletion mode FET; and adjusting the current-setting control voltage to reduce a deviation of an actual resistance of the fixed resistor from a designed resistance value.

* * * * *